(12) United States Patent
Nakaya et al.

(10) Patent No.: US 6,526,095 B1
(45) Date of Patent: *Feb. 25, 2003

(54) INTER-FRAME PREDICTED IMAGE SYNTHESIZING METHOD

(75) Inventors: Yuichiro Nakaya, Tokyo; Yoshinori Suzuki, Urawa, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/933,377

(22) Filed: Sep. 19, 1997

(30) Foreign Application Priority Data

Sep. 20, 1996 (JP) .............................. 8-249601

(51) Int. Cl.[7] .................................................. H04N 7/12
(52) U.S. Cl. .................................................. 375/240.16
(58) Field of Search ....................... 375/240.16, 240.01, 375/240.08, 240.09

(56) References Cited

U.S. PATENT DOCUMENTS

| | | | | |
|---|---|---|---|---|
| 5,581,308 A | * | 12/1996 | Lee | 348/416.1 |
| 5,598,216 A | * | 1/1997 | Lee | 348/416.1 |
| 5,646,691 A | * | 7/1997 | Yokoyama | 348/416.1 |
| 5,668,608 A | * | 9/1997 | Lee | 348/699 |
| 5,684,538 A | * | 11/1997 | Nakaya et al. | 348/416.1 |
| 5,751,362 A | * | 5/1998 | Lee | 348/416.1 |
| 5,751,365 A | * | 5/1998 | Yokoyama | 348/416.1 |
| 5,886,742 A | * | 3/1999 | Hibiu et al. | 348/699 |
| 5,963,259 A | * | 10/1999 | Nakaya et al. | 348/416.1 |
| 5,978,030 A | * | 11/1999 | Jung et al. | 348/416.1 |
| 6,008,852 A | * | 12/1999 | Nakaya | 375/240.16 |

OTHER PUBLICATIONS

Sullivan et al, "Motion compensation for video compression using control grid interpolation", Acoustics, Speech, and Signal Processing, pp. 2713–2716 vol. 4, Apr. 1991.*

* cited by examiner

Primary Examiner—Young Lee
(74) Attorney, Agent, or Firm—Antonelli, Terry, Stout & Kraus, LLP

(57) ABSTRACT

A method and apparatus for simplifying an operation for the processing of a warping prediction of dividing an image into patches and deforming each patch by affine transform or bilinear transform. Motion vectors of a plurality of representative points in which a spatial interval has a special feature are obtained from at least one patch formed with a plurality of grid points. Information of the motion vectors are used for synthesis of a predicted image. The division for synthesizing a predicted image in the case of warping prediction is replaced with a shift operation, thereby simplifying the processing by a computer or exclusive hardware.

16 Claims, 7 Drawing Sheets

REFERENCE IMAGE

ORIGINAL IMAGE OF CURRENT FRAME

PATCH AND GRID POINT OF REFERENCE IMAGE AFTER MOTION ESTIMATION

PATCH AND GRID POINT OF ORIGINAL IMAGE OF CURRENT FRAME

SOFTWARE ENCODER

SOFTWARE DECODER

INTER-FRAME PREDICTED IMAGE SYNTHESIZING METHOD

CROSS REFERENCE TO RELATED APPLICATION

This application is related to application Ser. No. 08/516,218 filed Aug. 17, 1995 now U.S. Pat. No. 5,684,538 entitled SYSTEM AND METHOD FOR PERFORMING VIDEO CODING/DECODING USING MOTION COMPENSATION and application Ser. No. 08/819,628, filed Mar. 17, 1997 now U.S. Pat. No. 6,008,852 entitled VIDEO CODER WITH GLOBAL MOTION COMPENSATION, the disclosures of which are incorporated herein by reference.

BACKGROUND OF THE INVENTION

The present invention relates to a method and apparatus for coding and decoding an image. More particularly the present invention relates to a method and apparatus of coding and decoding an image by the use of a motion compensation method wherein an image is divided, into patches and each patch is deformed by affine or bilinear transformation.

In the case of high-efficiency coding of a dynamic image by a coder, it is known that motion compensation is very effective for data compression due to similarity between frames temporally close to each other. The processing of an image by motion compensation is performed according to equation 1, shown below. In this case, it is assumed that the predicted image of a frame (current frame) to be coded is P(x,y) and a reference image (decoded image of a frame which is temporally close to P and whose coding is already completed) is R(x,y). Moreover, it is assumed that x and y are integers and a pixel is present at a point whose coordinate values are integers for P and R. In this case, the relation between P and R is also shown by the equation 1 shown below.

$$P(x,y)=R(f_i(x,y),g_i(x,y)),(x,y) \epsilon P_i, 0 \leq i < N \quad \text{Equation 1}$$

In this case, Pi denotes a pixel included in the i-th patch of an image by assuming that the image is divided into N small regions (patches). Moreover, transformation functions $f_i(x,y)$ and $g_i(x,y)$ show the spatial correspondence between the image of a current frame and a reference image. In this case, the motion vector of the pixel (x,y) in Pi can be shown by ($f_i(x,y)-x, g_i(x,y)-y$) by using the coordinates of a pixel in a predicted image as a starting point and the coordinates of a correspondent point in the reference image as an ending point.

In the case of H.261, of Motion Picture Experts Group (MPEG)1, and MPEG2 which are the international standards for the video coding method, a method referred to as block matching is used in which $f_i(x,y)-x$ and $g_i(x,y)-y$ are constants unrelated to x or y. However, to achieve a data compression ratio higher than these standard coding methods, it is required to use a higher-level motion compensation method. As the above new motion compensation method, a motion compensation method has recently been proposed which allows that $f_i(x,y)-x$ and $g_i(x,y)-y$ are not constants but pixels in the same patch have different motion vectors. As transformation functions of these methods, the following examples have been disclosed.

"Basic study of motion compensation according to triangle patch", by Nakaya et al., Technical report of IEICE, IE90-106, Hei 2-03 discloses an example of affine transform as follows:

$$f_i(x,y)=a_{i0}x+a_{i1}y+a_{i2}$$

$$g_i(x,y)=a_{i3}x+a_{i4}y+a_{i5} \quad \text{Equation 2}$$

"Motion compensation for video compression control grid interpolation", by G. J. Sullivan et al., Proc. ICASSP '91, M9.1, pp. 2713–2716, 1991-05 discloses an example of bilinear transform as follows:

$$f_i(x,y)=b_{i0}xy+b_{i1}x+b_{i2}y+b_{i3}$$

$$g_i(x,y)=b_{i4}xy+b_{i5}x+b_{i6}y+b_{i7} \quad \text{Equation 3}$$

In the above equations, aij and bij denote motion parameters estimated for each patch. When the value of a transformation function is not an integer, coordinate values are not integers. Therefore, it is necessary to obtain the luminance value of a point where no pixel is actually present in a reference image. In this case, bilinear interpolation using four peripheral pixels is frequently performed. When describing the above interpolation method in the form of the equation, $R(x+\xi,y+\eta)$ is shown below by assuming $0 \leq \xi, \eta < 1$.

$$R(x+\xi,y+\eta)=(1-\eta)((1-\xi)R(x,y)+\xi R(x+1, y))+\eta(1-\xi)R(x,y+1)+\xi R(x+1,y+1)) \quad \text{Equation 4}$$

Hereinafter, the motion compensation method using the transformation functions in the above equations 2 and 3 is referred to as warping prediction.

To transmit motion information, a video coder must transmit information capable of specifying the motion parameter of a transformation function to the receiving side in some manner. For example, the transformation function uses affine transform and the shape of a patch is assumed as a triangle. In this case, even if six motion parameters are directly transmitted to or the motion vectors of three apexes of the patch are transmitted to the receiving side, it must be possible for the receiving side to reproduce the six motion parameters ai1 to ai6.

FIGS. 1a–d illustrate an example of the motion compensation method of transmitting motion vectors of apexes (grid points) of a triangle patch. FIGS. 1a–d illustrate the processing for synthesizing a predicted image of an original image 102 of a current frame by using a reference image 101. First, the current frame is divided into a plurality of polygonal patches and formed into a patch-divided image 108 as illustrated in FIG. 1d. An apex of a patch is referred to as a grid point and each grid point is shared by a plurality of patches. For example, a patch 109 is formed with grid points 110, 111, and 112 and these grid points also serve as apexes of another patch. Thus, after an image is divided into a plurality of patches, motion estimation is performed.

In the case of the example shown in FIGS. 1a–b, motion estimation is performed between the predicted image and the reference image for each grid point. As a result, each patch is deformed by a reference image 103 after motion estimation as illustrated in FIG. 1c. For example, the patch 109 corresponds to a deformed patch 104. This is because it is estimated that grid points 105, 106, and 107 respectively correspond to the grid points 110, 111, and 112. In the case of this example, when assuming the coordinates of the grid points 110, 111, and 112 as (I,J), (I+r,J), and (I,J+s) (where I, J, r, and s are integers) respectively and the motion vectors of the points as (U1,V1), (U2,V2), and (U3,V3) respectively, the motion vector (ua(x,y),va(x,y)) at the point (x,y) in the patch can be shown by the following equation 5 in accordance with the relation of the equation 2.

$$u_a(x, y) = \frac{U_1 - U_0}{r}(x - I) + \frac{U_2 - U_0}{s}(y - J) + U_0$$
$$v_a(x, y) = \frac{V_1 - V_0}{r}(x - I) + \frac{V_2 - V_0}{s}(y - J) + V_0$$

Equation 5

By using the relation, it is possible to obtain the motion vector for each pixel and synthesize a predicted image.

Moreover, when deforming a quadrangular patch by using bilinear transform, the motion vector ub(x,y),vb(x,y) at a point (x,y) in the patch can be shown by the following equation in accordance with the relation of the equation 3 by assuming the coordinates of grid points as (I,J), (I+r,J), (I,J+s), and (I+r,J+s) and the motion vectors of the points as (U1,V1), (U2,V2), (U3,V3), and (U4,V4).

$$ub(x, y) = \frac{J + s - y}{s}\left(\frac{I + r - x}{r}U_0 + \frac{x - I}{r}U_1\right) + \frac{y - J}{s}\left(\frac{I + r - x}{r}U_2 + \frac{x - I}{r}U_3\right)$$
$$= \frac{U_0 - U_1 - U_2 + U_3}{rs}(x - I)(y - J) + \frac{-U_0 + U_1}{r}(x - I)$$
$$+ \frac{-U_0 + U_2}{s}(y - J) + U_0$$
$$vb(x, y) = \frac{V_0 - V_1 - V_2 + V_3}{rs}(x - I)(y - J) + \frac{-V_0 + V_1}{r}(x - I)$$
$$+ \frac{-V_0 + V_2}{s}(y - J) + V_0$$

Equation 6

By introducing the above-described warping prediction, it is possible to accurately approximate the motion vectors of an image sequence and realize a high data compression ratio. However, the throughput for coding and decoding decreases compared to a conventional method. Particularly, the divisions performed in the equations 5 and 6 are large factors for complicating the processing. Therefore, the warping prediction using affine transform and bilinear transform has a problem that the throughput for synthesizing a predicted image decreases.

SUMMARY OF THE INVENTION

It is an object of the present invention to decrease the number of operations performed in an image coding process by replacing the division processing in the warping prediction with a binary shift operation.

The division processing can be realized by a shift operation by obtaining and using the motion vector of an assumed grid point (representative point).

The present invention provides a method, apparatus and computer program for synthesizing an inter-frame predicted image using a motion compensation process of dividing an image into N patches, wherein N is a positive integer, and deforming the patches through affine transform. Pixel sampling of an image is performed at an interval of 1 in the horizontal and vertical directions and a sampling point is present on a point in which the horizontal and vertical components of coordinates are integers.

The inter-frame predicted image is synthesized by obtaining motion vectors of three representative points in which coordinates are represented by (I', J'), (I'+p, J'), and (I', J'+q) in at least in one patch Pa, and computing a motion vector of each pixel in the patch using the motion vectors of the three representative points. Either of p and −p is equal to $2^\alpha$, where $\alpha$ is a positive integer, in the patch Pa, and either of q and −q is equal to $2^\beta$, where $\beta$ is a positive integer, in the patch Pa. A triangle formed by said three representative points in the patch Pa does not coincide with the shape of the patch.

The present invention also provides a method apparatus and computer program for synthesizing an inter-frame predicted image using a motion compensation process of dividing an image into N patches, wherein N is a positive integer, and deforming the patches through bilinear transform. Pixel sampling of an image is performed at an interval of 1 in the horizontal and vertical directions and a sampling point is present on a point in which the horizontal and vertical components of coordinates are integers.

The inter-frame predicted image is synthesized by obtaining motion vectors of four representative points in which coordinates are represented by (I',J'), (I'+p,J'), (I',J'+q), and (I'+p,J'+q) in at least one patch Pb and computing a motion vector of each pixel in the at least one patch using the motion vectors of the four representative points. Either of p and −p is equal to $2^\alpha$, where $\alpha$ is a positive integer, in the at least one patch Pb and either of q and −q is equal to $2^\beta$, where $\beta$ is a positive integer, in the at least one patch Pb. A rectangle formed by the four representative points in the at least one patch Pb does not coincide with the shape of the patch.

BRIEF DESCRIPTION OF THE DRAWINGS

The present invention will be more apparent from the following detailed description, when taken in conjunction with the accompanying drawings, in which.

DESCRIPTION OF THE PREFERRED EMBODIMENTS

In the following, it is assumed that a pixel sampling interval is equal to 1 in both horizontal and vertical directions and a pixel is present at a point in which the horizontal and vertical components of coordinates are integers. Moreover, the present invention is realized by applying the invention related to a method for accelerating an operation for global motion compensation to warping prediction as disclosed in Japanese Patent Application No. 060572/1996.

When performing the warping prediction using affine transform or bilinear transform, it is possible to obtain the advantages that mismatching is prevented and operations are simplified by quantizing the motion vector for each pixel as disclosed in Japanese Patent Application Nos. 193970/1994, 278629/1995. It is hereafter assumed that the horizontal and vertical components of the motion vector of a pixel are quantized to values integral multiples of $1/m$, wherein m is a positive integer. Moreover, it is assumed that the warping prediction for transmitting the motion vectors of grid points as described above is performed and the horizontal and vertical components of the motion vector of each grid point are quantized to values integral multiples of $1/n$, wherein n is a positive integer, and then transmitted.

Figure 1A:
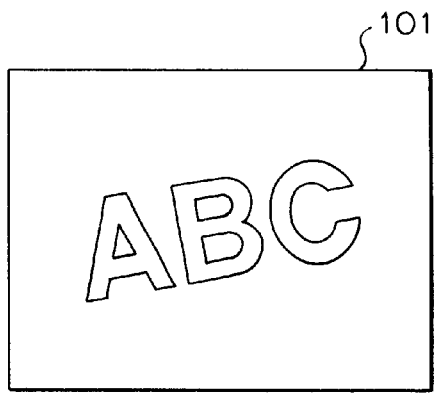
FIGS. 1a–d illustrate a reference image and an original image for the processing of warping prediction according to affine transform.
Figure 1B:
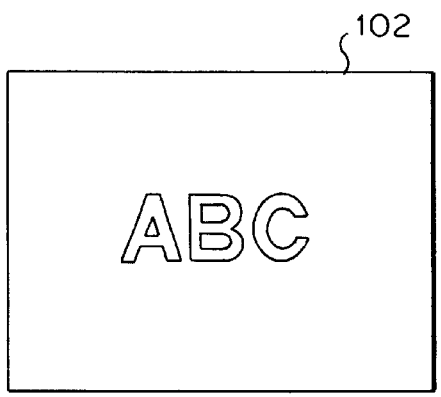
Figure 1C:
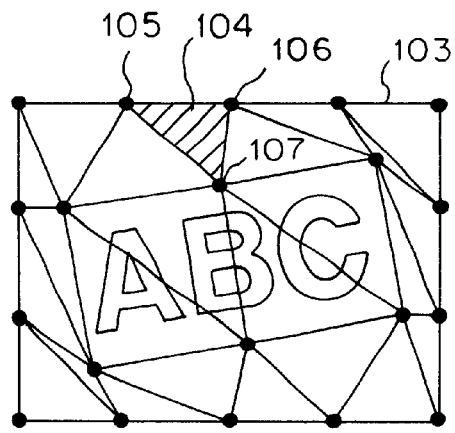
Figure 1D:
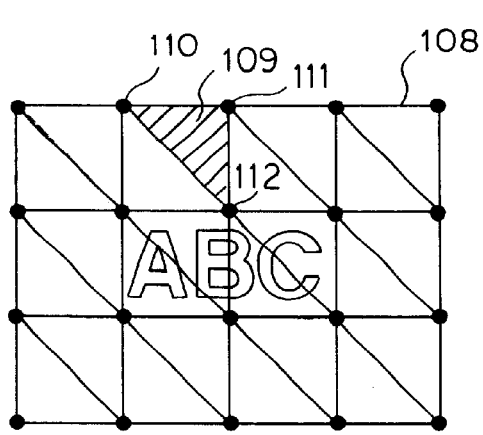
Figure 2:
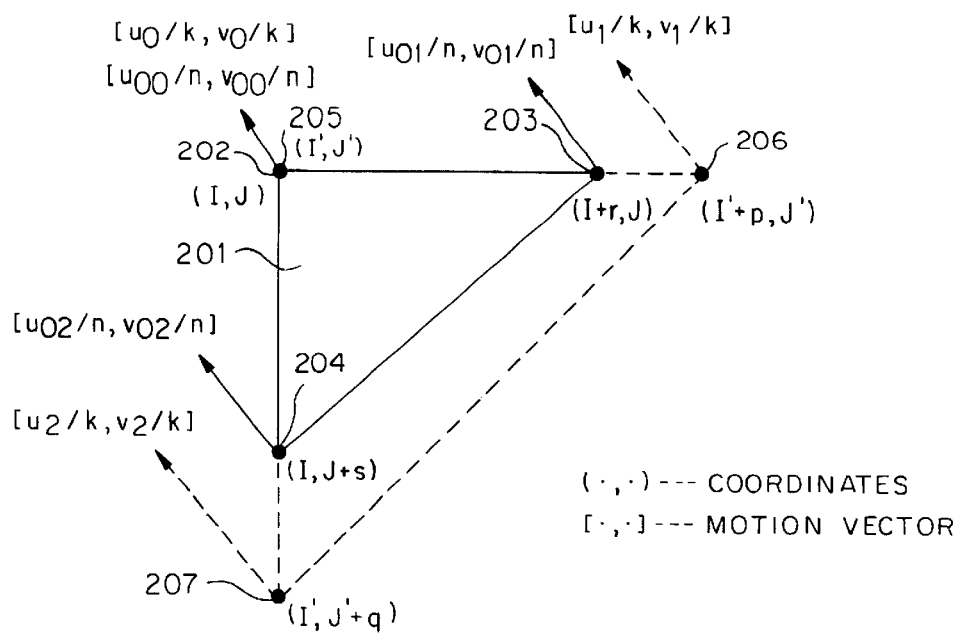
FIG. 2 illustrates a patch, grid point, and representative point for the warping prediction according to affine transform.

In this case, when it is assumed that (u00,v00), (u01,v01), and (u02,v02), wherein u00, v00, u01, v01, u02, and v02 are integers, are obtained by multiplying the horizontal and vertical components of the motion vectors of grid points 202, 203, and 204 located at the apexes (I,J), (I+r,J), and (I,J+s), wherein I, J, r, and S are integers of the patch 201 illustrated in FIG. 2 by n respectively, (u(x,y),v(x,y)), wherein u(x,y) and v(x,y) are integers, obtained by multiplying the horizontal and vertical components of the motion vector of a pixel in the patch formed by the above grid points by m can be shown by the following equation 7 in accordance with equation 5.

$$u(x,y)=((u_{01}-u_{00})(x-I)s+(u_{02}-u_{00})(y-J)r+u_{00}rs)m//(rsn)$$

$$v(x,y)=((v_{01}-v_{00})(x-I)s+(v_{02}-v_{00})(y-J)r+v_{00}rs)m//(rsn) \quad \text{Equation 7}$$

In the above equation 7, the symbol "//" denotes a division for rounding an operation result obtained from a division of a real number into a nearby integer when the result is not an integer and its priority as an operator is equal to that of a multiplication or division. To decrease an operation error, it is preferable that a non-integer value is rounded into the nearest integer. In this case, the following methods are considered as methods for rounding a value obtained by adding 1/2 to an integer.

(1) To round the value in the direction toward 0.
(2) To round the value in the direction away from 0.
(3) To round the value in the direction toward 0 when a dividend is negative but in the direction away from 0 when the dividend is positive wherein it is assumed that a divisor is always positive.
(4) To round the value in the direction away from 0 when a dividend is negative but in the direction toward 0 when the dividend is positive wherein it is assumed that a divisor is always positive.

Among the above methods (1) to (4), the methods (3) and (4) are advantageous because of increased throughput as not requiring a decision as to whether a dividend is positive or negative because the rounding direction does not change independently of whether the dividend is positive or negative. For example, a high-speed processing using the method (3) can be realized in accordance with the following equation 8.

$$u(x,y)=(Lrsn+((u_{01}-u_{00})(x-I)s+(u_{02}-u_{00})(y-J)r+u_{00}rs)m+(rsn\#2))\#(rsn)-L$$

$$v(x,y)=(Mrsn+((v_{01}-u_{00})(x-I)s+(v_{02}-v_{00})(y-J)r+v_{00}rs)m+(rsn\#2))\#(rsn)-M \quad \text{Equation 8}$$

In the above equation 8, the symbol "#" denotes a division between positive integers for dropping the fractional portion in the direction of 0, which can most-easily be realized by a computer. Moreover, in the above formula, L and M denote large-enough positive integers for keeping a dividend for a division always positive. Furthermore, the term of $(r \cdot s \cdot n \# 2)$ is used to round a division result into the nearest integer.

By using the equation 8, it is possible to realize the processing of the warping prediction using affine transform only by integer operations. Moreover, if the value of $r \cdot s \cdot n$ is equal to the positive integer-th power of 2, it is possible to replace a division with a binary shift operation and greatly simplify the operation. However, to realize the replacement, all of r, s, and n must be the positive integer-th power of 2.

A method for replacing a division with a shift operation is described below even if at least one of r, s, and n is not the positive integer-th power of 2. By expanding the motion vector field described by the equation 7, assumed grid points (representative points) 205, 206, and 207 are arranged at f(I',J'), (I'+p,J'), and (I', J'+q), wherein I', J', p, and q are integers shown in FIG. 2. In this example, the coordinates of the grid point 202 coincide with the coordinates of the representative point 205, the "grid point 202" and the "representative point 205" have a semantics different from each other. An assumed patch is formed by these representative points and motion vectors are computed by using the assumed patch. It is assumed that the horizontal and vertical components of the motion vector of each representative point are quantized to values integral multiples of $1/k$, wherein k is a positive integer. When it is assumed that values obtained by multiplying the horizontal and vertical components of the motion vectors of the representative points 205, 206, and 207 by k are (u0,v0), (u1,v1), and (u2,v2), wherein u0, v0, u1, v1, u2, and v2 are integers respectively, these values can be shown by the following equations 9 and 10.

$$u_0=u'(I',J')$$

$$v_0=v'(I',J')$$

$$u_1=u'(I'+p,J')$$

$$v_1=v'(I'+p,J')$$

$$u_2=u'(I',J'+q)$$

$$v_2=v'(I',J'+q) \quad \text{Equation 9}$$

$$u'(x,y)=((u_{01}-u_{00})(x-I)s+(u_{02}-u_{00})(y-J)r+u_{00}rs)k///(rsn)$$

$$v'(x,y)=((v_{01}-v_{00})(x-I)s+(v_{02}-v_{00})(y-J)r+v_{00}rs)k///(rsn) \quad \text{Equation 10}$$

In the above equation 10, u'(x,y) and v'(x,y) are integers and symbol "///" denotes a division for rounding an operation result obtained from a division of a real number into a nearby integer when the result is not an integer and its priority as an operator is equal to that of a multiplication or division.

A preferable approximation of the equation 7 can be obtained by using the motion vectors of these representative points and thereby, showing (u"(x,y), v"(x,y)), wherein u"(x,y) and v"(x,y) are integers, obtained by multiplying the horizontal and vertical components of the motion vectors of the pixels in the assumed patch by m as the following equation 11.

$$u''(x,y)=((u_1-u_0)(x-I')q+(u_2-u_0)(y-J')p+u_0pq)m//(pqk)$$

$$v''(x,y)=((v_1-v_0)(x-I')q+(v_2-v_0)(y-J')p+v_0pq)m//(pqk) \quad \text{Equation 11}$$

In this case, by setting the value of p, q, and k to the positive integer-th power of 2, it is possible to replace the divisions of the equation 11 with shift operations and greatly simplify the operations.

For warping prediction, the size of a patch is an important parameter for determining a coding characteristic. In general, when decreasing the size of a patch, the accuracy of motion compensation prediction is improved but the number of motion parameters increases by a value equivalent to the decrease of the size and the amount of motion information to be transmitted increases. However, when increasing the size of a patch, the amount of motion information decreases but the prediction characteristic is deteriorated by a value equivalent to the increase of the size. Therefore, in the case of the above example, the values of r and s at which the best coding characteristic is obtained are not always the positive integer-th power of 2. When r or s is not the positive integer-th power of 2, it is possible to execute a high-speed operation similarly to the case in which r and s are the positive integer-th power of 2 by applying the above-described method of using an assumed patch to the above example.

The method of using an assumed patch can also be applied to the warping prediction using bilinear transform. In the case of the description below, it is assumed that the horizontal and vertical components of the motion vectors of a pixel, grid point, and representative point are quantized to values integral multiples of 1/m, 1/n, and 1/k, wherein m, n, and k are positive integers, respectively, similarly to the above case. Moreover, the definitions of symbols "//" and "///" are the same as the above mentioned. For the patch 301 shown in FIG. 3, when assuming that values obtained by multiplying the horizontal and vertical components of the motion vectors of grid points 302, 303, 304, and 305 located at (I,J), (I+r,J), (I,J+s), and (I,J+s), wherein I, J, r, and s are integers, by n are (u00,v00), (u01,v01), (u02,v02), and (u03,v03), wherein u00, v00, u01, v01, u02, v02, u03, and v03 are integers, respectively, (u(x,y),v(x,y)), wherein u(x,y) and v(x,y)) are integers, obtained by multiplying the horizontal and vertical components of the motion vectors of the pixels in a patch formed with these grid points by m can be shown by the following equation 12.

$$u(x,y)=((J+s-y)((I+r-x)u_{00}+(x-I)u_{01})+(y-J)((I+r-x)u_{02}+(x-I)u_{03}))m//(rsn)$$

$$v(x,y)=((J+s-y)((I+r-x)v_{00}+(x-I)v_{01})+(y-J)((I+r-x)v_{02}+(x-I)v_{03}))m//(rsn) \quad \text{Equation 12}$$

Figure 3:
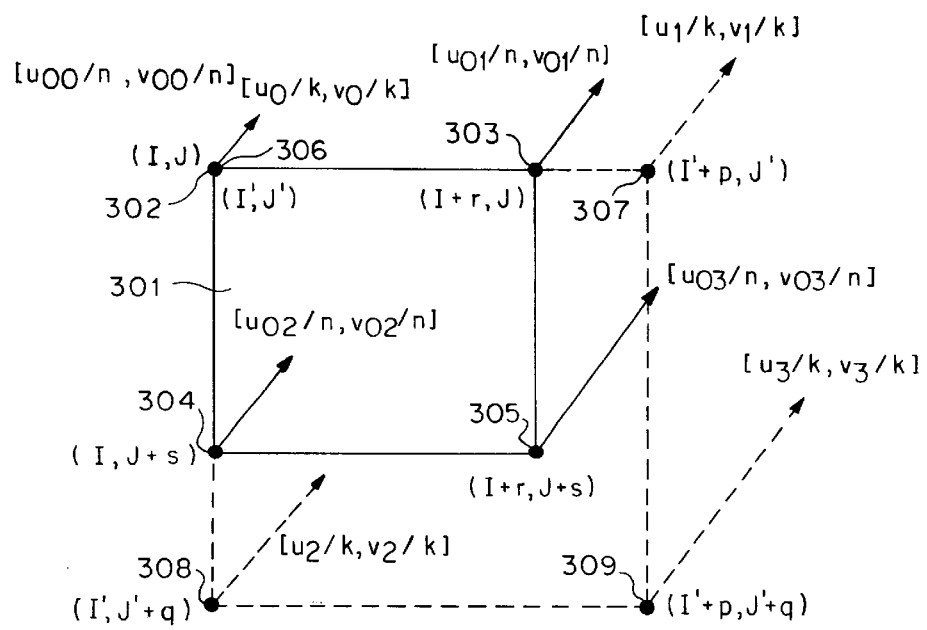
FIG. 3 illustrates a patch, grid point, and representative point for the warping prediction according to bilinear transform.

The motion vector field described by the above equation 12 is expanded to arrange representative points 306, 307, 308, and 309 at (I',J'), (I'+p,J'), (I',J'+q), and (I'+p,J'+q), wherein I', J', p, and q are integers, as shown in FIG. 3. In this example, the coordinates of the grid point 302 coincide with the coordinates of the representative point 306, the "grid point 302" and the "representative point 306" have a different semantics from each other. An assumed patch is formed with these representative points and motion vectors are computed by using the patch. When assuming that values obtained by multiplying the horizontal and vertical components of the motion vectors of the representative points 306, 307, 308, and 309 by k are (u0,v0), (u1,v1), (u2,v2), and (u3,v3), wherein u0, v0, u1, v1, u2, v2, u3, and v3 are integers, respectively, these values can be shown by the following equations 13 and 14.

$$u_0=u'(I',J')$$

$$v_0=v'(I',J')$$

$$u_1=u'(I'+p,J')$$

$$v_1=v'(I'+p,J')$$

$$u_2=u'(I',J'+q)$$

$$v_2=v'(I',J'+q)$$

$$u_3=u'(I'+p,J'+q)$$

$$v_3=v'(I'+p,J'+q) \quad \text{Equation 13}$$

$$u'(x,y)=((J+s-y)((I+r-x)u_{00}+(x-I)u_{01})+(y-J)((I+r-x)u_{02}+(x-I)u_{03}))k//(rsn)$$

$$v'(x,y)=((J+s-y)((I+r-x)v_{00}+(x-I)v_{01})+(y-J)((I+r-x)v_{02}+(x-I)v_{03}))k//(rsn) \quad \text{Equation 14}$$

In the above equations 13 and 14, u'(x,y) and v'(x,y) are integers and the definition of symbol "///" is the same as the above.

By using the motion vectors of these representative points and thereby, showing (u"(x,y),v"(x,y)) (u"(x,y) and v"(x,y) are integers obtained by multiplying the horizontal and vertical components of the motion vectors of the pixel in the assumed patch by m as the following equation 15, it is possible to obtain a preferable approximation of the equation 12.

$$u''(x,y)=((J'+q-y)((I'+p-x)u_0+(x-I')u_1)+(y-J')((I'+p-x)u_2+(x-I')u_3))m//(pqk)$$

$$v''(x,y)=((J'+q-y)((I'+p-x)v_0+(x-I')v_1)+(y-J')((I'+p-x)v_2+(x-I')v_3))m//(pqk) \quad \text{Equation 15}$$

In this case, by setting the values of p, q, and k to the positive integer-th power of 2, it is possible to replace the divisions in the equation 15 with shift operations and greatly simply the operations.

When performing the warping prediction using an assumed patch, it is possible to consider the methods for transmitting (i) the motion vector of a grid point, (ii) the motion vector of a representative point, and (iii) a motion parameter. The method (ii) is advantageous from the viewpoint that the computation for obtaining the motion vector of a representative point by a decoder is not performed. However, when one grid point is shared by a plurality of patches as shown in FIG. 1, the method (i) is more advantageous. Moreover, when a certain limited range (e.g. a range within ±32 pixels) is provided for the motion vectors of pixels in a patch, the method (i) has a feature that the motion vector of a grid point to be transmitted is always kept in the limited range.

This feature is effective when designing the code word of a motion vector to be transmitted or determining the number of digits necessary for operations. However, it is necessary to carefully perform the operations (equations 9, 10, 13, and 14) for obtaining the motion vector of a representative point from the motion vector of a grid point in accordance with the method (i). It is necessary to consider that a motion vector obtained from the equation 11 or 15 may go out of a set limited range because of an error due to rounding into an integer. Particularly, it is necessary to pay attention to the case in which a representative point is located inside of a patch. This is because a motion vector can be obtained for a pixel located outside of a triangle or rectangle enclosed by representative points through extrapolation in the case of the equations 11 or 15 and thereby, the rounding error when obtaining the motion vector of a representative point may be amplified. Therefore, it is preferable that a representative point is located outside of a patch. However, when increasing the size of an assumed patch, the range of the value of the motion vector of a representative point is widened and the number of digits for operations increases. Therefore, a larger patch is not always better. As a result, an assumed patch as small as possible is preferable among those including an original patch.

In the case of the method (iii), for example, the motion parameter aij of the equation 2 is transmitted. In this case, it is possible to obtain the motion vector of a representative point from the parameter and compute the motion vectors of the pixels in a patch by using the equation 11. In this case, it is also possible to use a parameter representing an enlargement or reduction rate or a rotation angle in addition to aij of the equation 2 or bij of the equation 3 as a motion parameter to be transmitted.

The present invention makes it possible to substitute the shift operation for the division for synthesizing a predicted image of global motion compensation, and to simplify the processing using either software or dedicated hardware or a combination of both.

Figure 4:
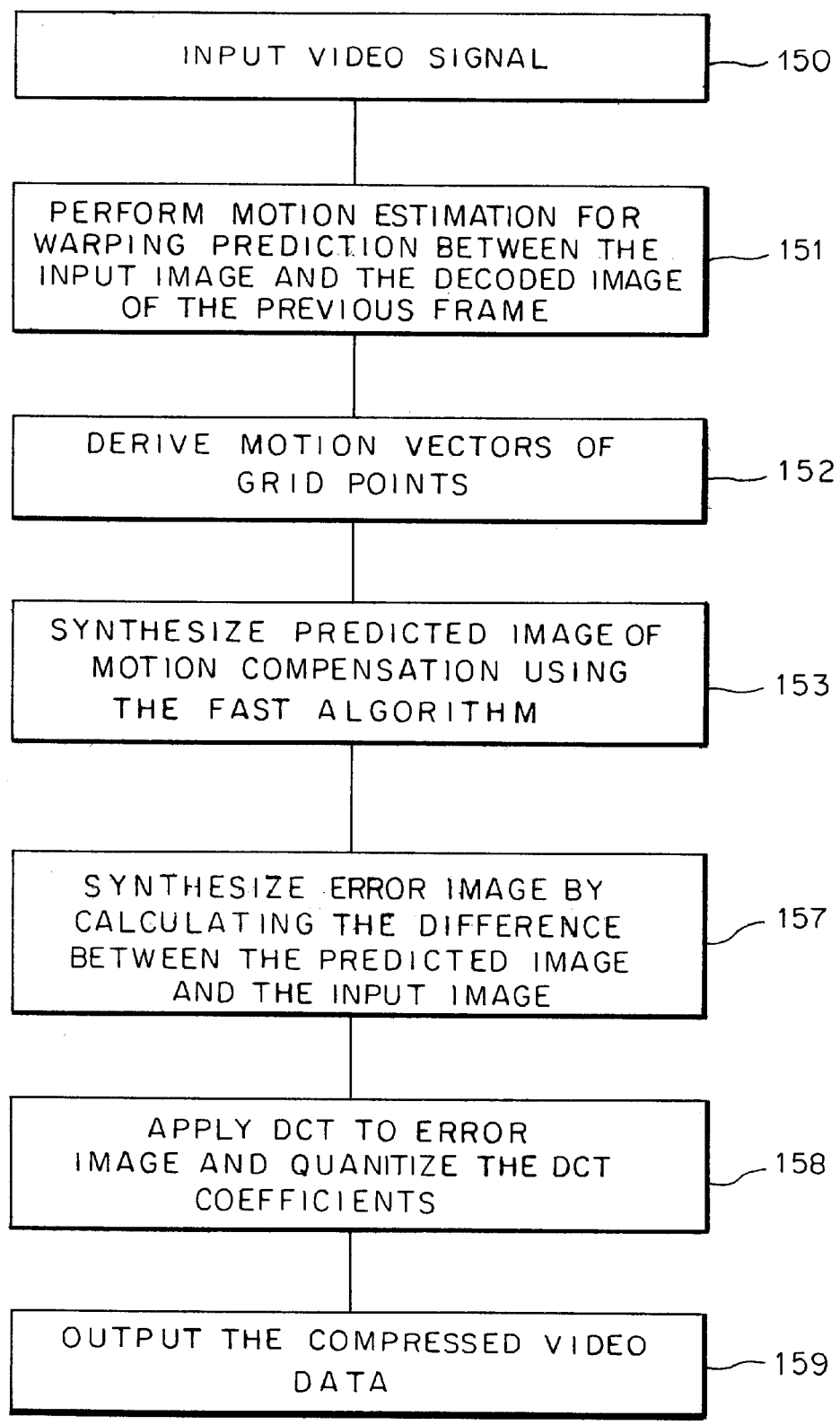
FIG. 4 illustrates a flow chart for performing video coding according to an embodiment of the invention.

FIG. 4 illustrates the steps followed in performing video coding of video image data using local motion compensation according to an embodiment of the present invention. In step 150, a video signal is input and in step 151, motion estimation for warping prediction is performed between an input image and the decoded image of a previous frame. Then, the motion vectors are derived from the grid points of the input image in step 152.

In the next step, step 153, a predicted image of motion compensation is synthesized using a fast algorithm. The fast algorithm is a general expression for algorithms disclosed herein, such as the bilinear algorithm and affine algorithm. For example, equation 2 is an affine algorithm whereas equation 3 is a bilinear algorithm. Further, equations 5, 7, 8 and 10 are affine whereas equations 6 and 12 are bilinear.

Then, in step 157, the error image is synthesized by calculating the difference between the predicted image and the input image and the error image is subject to a discrete cosine transform for quantizing the DCT coefficients in step 158. Finally, in step 159, the compressed video data is output.

Figure 5:
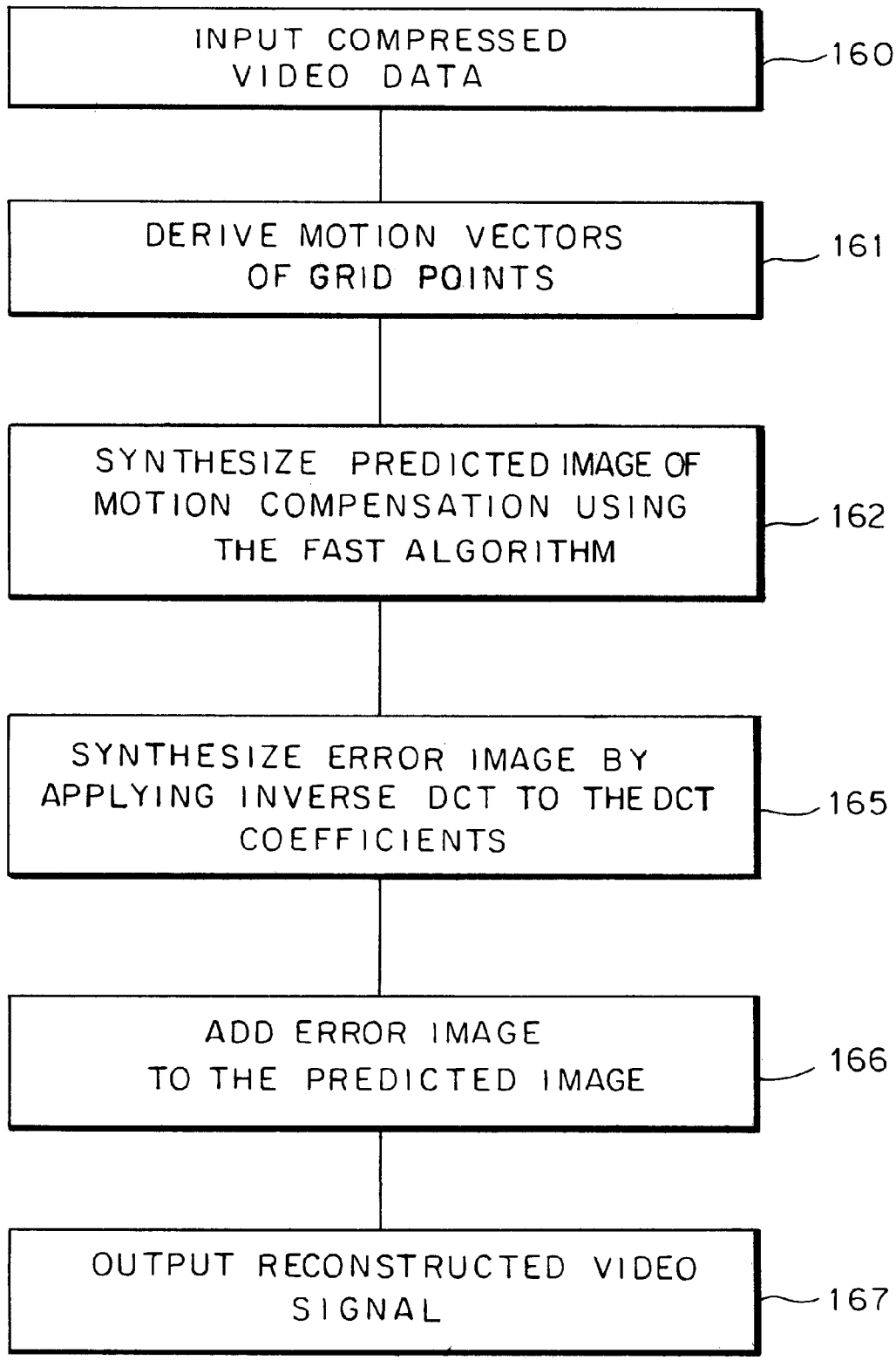
FIG. 5 illustrates a flow chart for video decoding according to an embodiment of the invention.

FIG. 5 illustrates a flow chart of the video decoding according to the present invention. In step 160, an input bit stream, such as a H.261 bit stream is received as the compressed video data. The motion vectors of the grid points are derived and in step 161 and in step 162, the predicted image of motion compensation is synthesized. The error image with respect to the predicted image is synthesized in step 165 and the error image is added to the predicted image in 166. In step 167, the reconstructed video signal is output to complete the decoding of the encoded video data.

Figure 6:
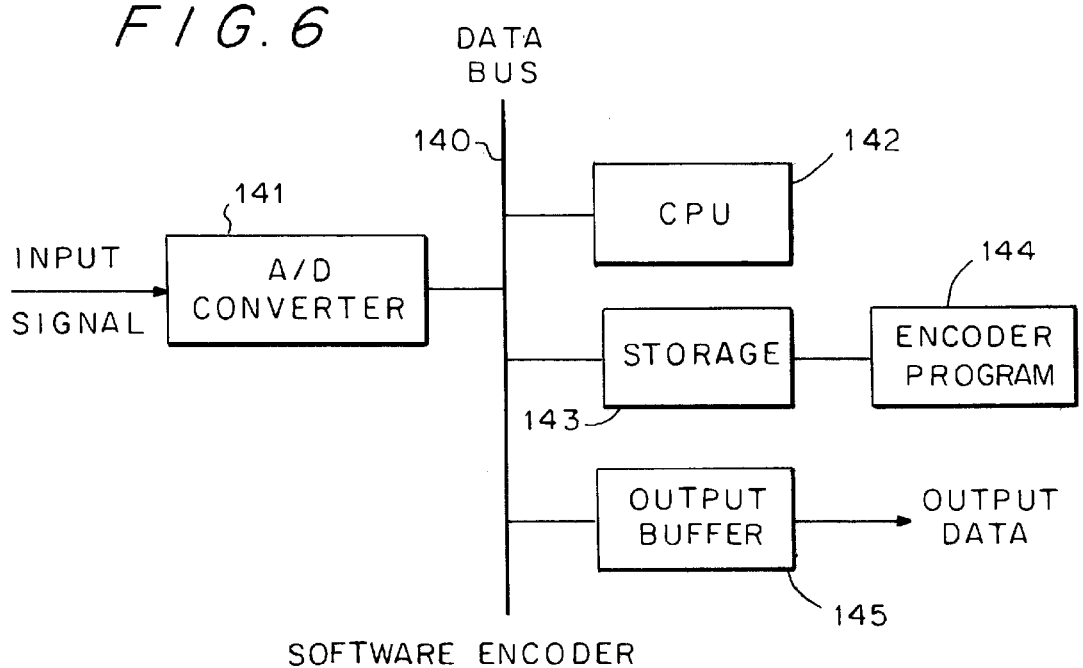
FIG. 6 is a diagram of a software encoder for a video coding method according to an embodiment of the invention.
Figure 7:
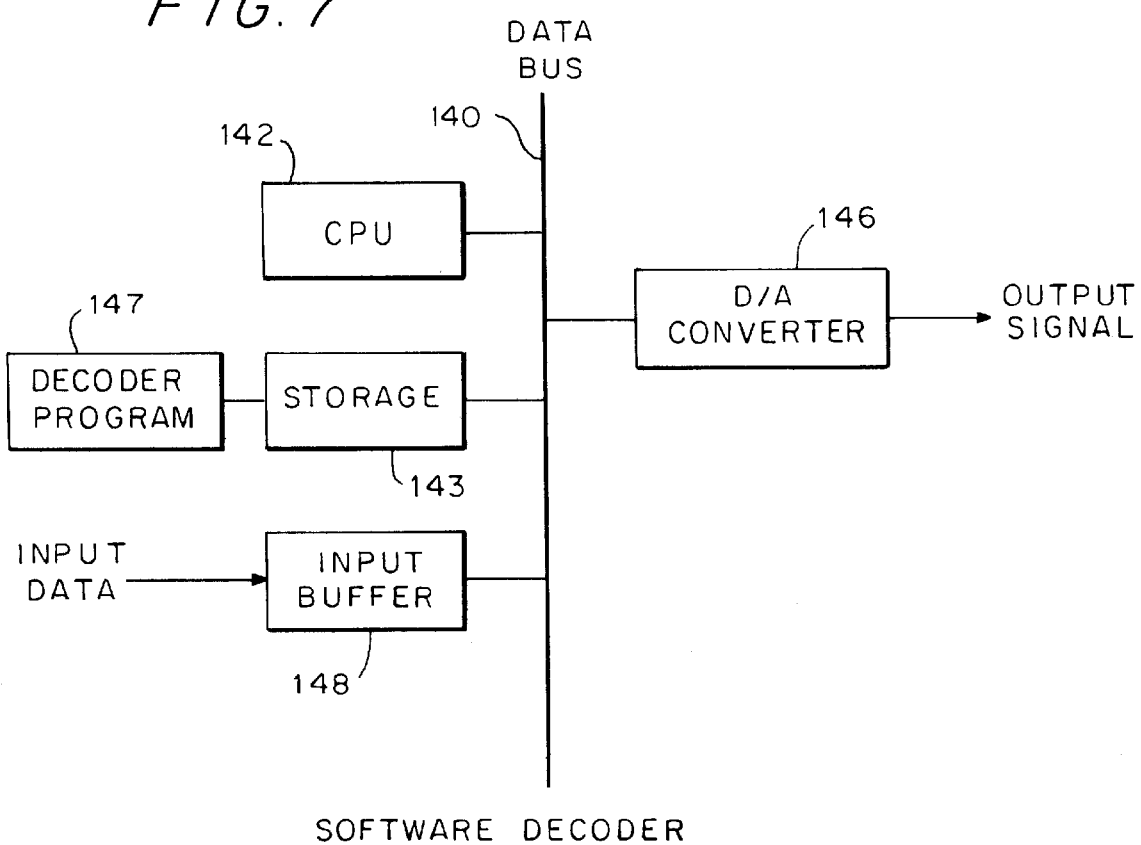
FIG. 7 is a diagram of a software decoder for a video decoding method according to the present invention.

FIGS. 6 and 7 are block diagrams of the components of the encoder and decoder of the invention for storing and executing software operating as disclosed in the flowcharts of FIGS. 4 nd 5. The components in common for both diagrams have the same reference numbers and include the data bus 140, CPU 142 and storage device 143. The encoder program for executing the video encoding is illustrated in FIG. 6, and is stored in storage device 143. The decoder program for executing the video decoding is illustrated in FIG. 7, and is stored in storage device 143. Storage devices 143 are storage media, such as hard disk drives, floppy disks or optical disks, for example.

With reference to FIG. 6, an input video signal is A/D converted by A/D converter 141 and sent to CPU 142 over bus 140. CPU 142 retrieves and executes the encoder program 144 stored in storage device 143 and then encodes and compresses the video data received from the A/D converter 141. After the video data is encoded, it is stored in an output buffer 145 and output as output data. Control data and timing signals are also output with the compressed video data.

FIG. 7 illustrates the processing of coded video signal, which is received at input buffer 148 and then read by CPU 142. CPU 142, which retrieves the decoder program 147 from the storage device 143, executes the decoding of the coded video data. The decoded video data is then sent over bus 140 to D/A converter 146 for outputting an analog video signal.

Figure 8:
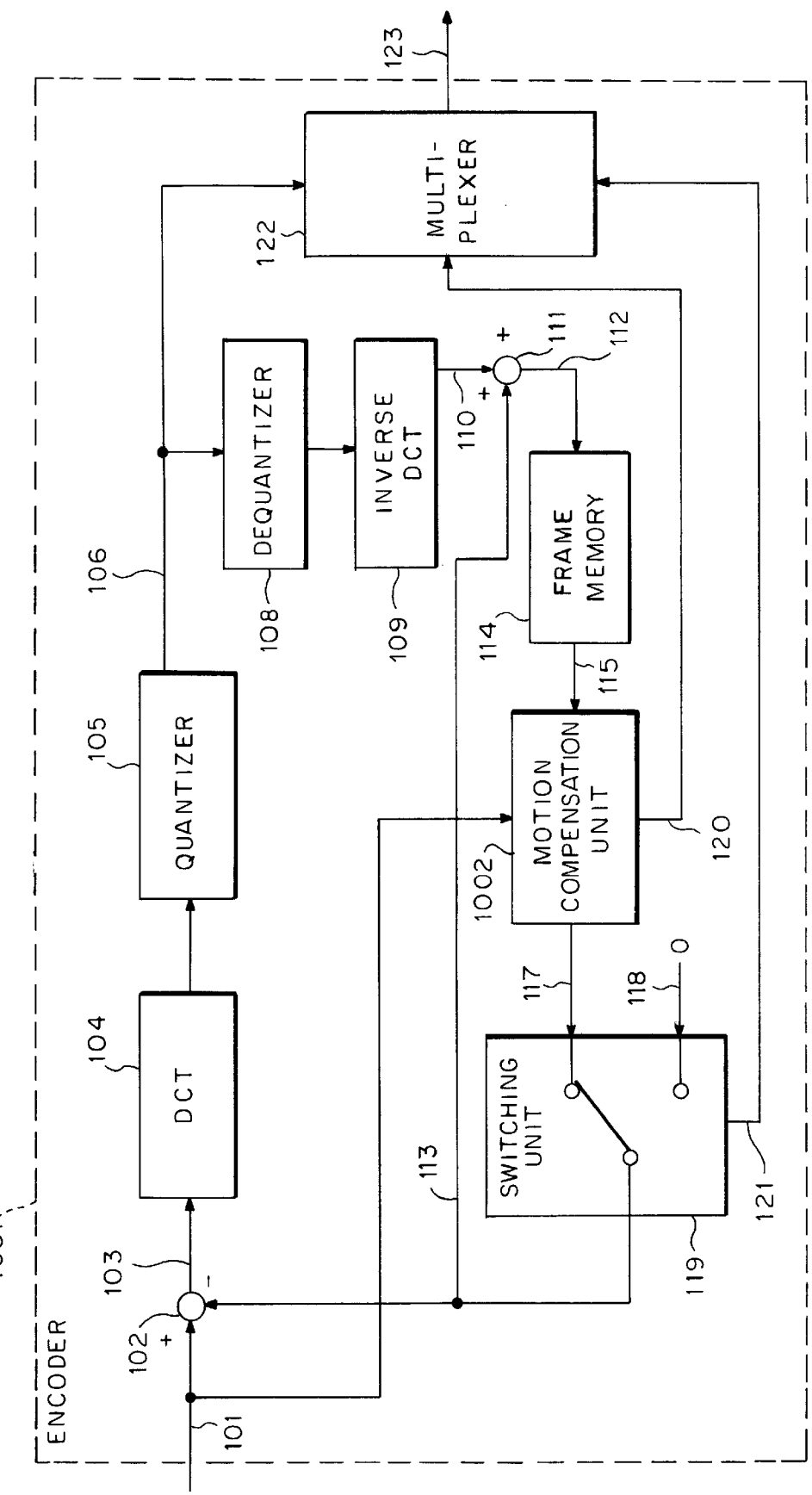
FIG. 8 is an overall diagram of a video encoder of the present invention.

FIG. 8 illustrates the overall block diagram of a video coder according to the invention. More particularly, FIG. 8 illustrates the construction of a video coder 1001 of the H.261 Standard which employs a hybrid coding system (adaptive interframe/intraframe coding method) which is a combination of block matching and DCT (discrete cosine transform). A subtractor 102 calculates the difference between an input image (original image of present frame) 101 and an output image 113 (that will be described later) of an interframe/intraframe switching unit 119, and outputs an error image 103. The error image is transformed into a DCT coefficient through a DCT processor 104 and is quantized through a quantizer 105 to obtain a quantized DCT coefficient 106. The quantized DCT coefficient is output as transfer data onto a communication line and is, at the same time, used in the coder to synthesize an interframe predicted image. A procedure for synthesizing the predicted image will be described below. The quantized DCT coefficient 106 passes through a dequantizer 108 and an inverse DCT processor 109 to form a reconstructed error image 110 (the same as the error image reproduced on the receiving side). An output image 113 (that will be described later) of the interframe/intraframe switching unit 119 is added thereto through an adder 111, thereby to obtain a reconstructed image 112 of the present frame (the same image as the reconstructed image of the present frame reproduced on the receiving side). The image is temporarily stored in a frame memory 114 and is delayed in time by one frame. At the present moment, therefore, the frame memory 114 is outputting a reconstructed image 115 of the preceding frame. The reconstructed image 101 of the present frame are input to motion estimation and compensation unit 1002.

In the motion estimation and compensation unit 1002, an image is divided into a plurality of blocks, and a portion most resembling the original image of the present frame is taken out for each of the blocks from the reconstructed image of the preceding frame, thereby synthesizing a predicted image 117 of the present frame. At this moment, it is necessary to execute a processing (local motion estimation)

for detecting how much the blocks have moved from the preceding frame to the present frame. The motion vectors of the blocks detected by the motion estimation are transmitted to the receiving side as motion data 120. From the motion data and the reconstructed image of the preceding frame, the receiving side can synthesize an estimated image which is the same as the one that is obtained independently on the transmitting side.

Referring again to FIG. 8, the estimated image 117 is input together with a "0" signal 118 to the interframe/intraframe switching unit 119. Upon selecting either of the two inputs, the switching unit switches the coding to either the interframe coding or the intraframe coding. When the predicted image 117 is selected, the interframe coding is executed. When the "0" signal is selected, on the other hand, the input image is directly DCT-coded and is output to the communication line. Therefore, the intraframe coding is executed.

In order to properly obtain the reconstructed image on the receiving side, it becomes necessary to know whether the interframe coding is executed or the intraframe coding is executed on the transmitting side. For this purpose, a distinction flag 121 is output to the communication line. The final H.261 coded bit stream 123 is obtained by multiplexing the quantized DCT coefficient, motion vector, and interframe/intraframe distinction flag into multiplexed data in a multiplexer 122.

Figure 9:
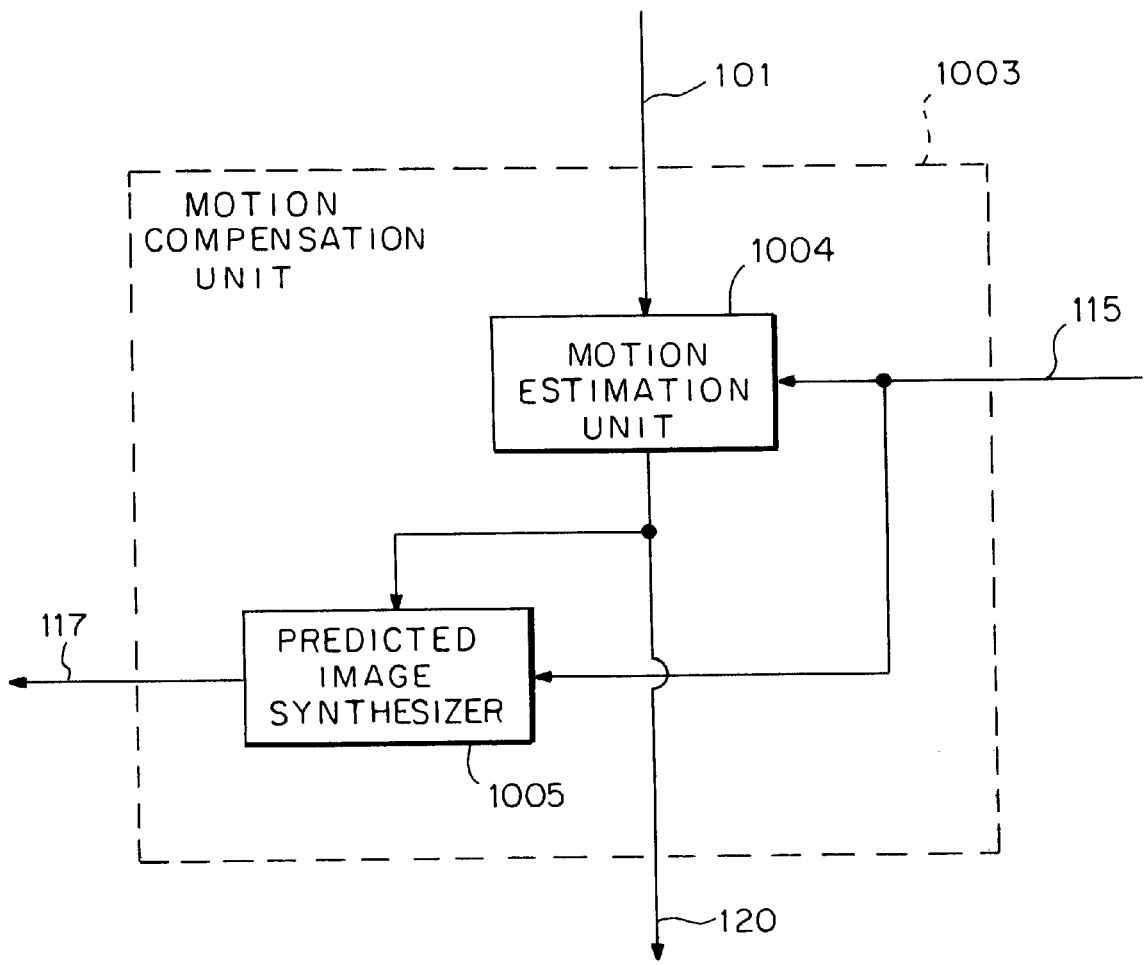
FIG. 9 is a diagram of a motion compensation unit used in the encoder of FIG. 8, according to one embodiment of the invention.

In FIG. 9, a motion estimation and compensation unit 1003 that performs warping prediction using fast synthesis of the predicted image is shown. Unit 1003 can be used as the motion estimation and compensation unit 1002 of FIG. 8.

As shown in FIG. 9, an input video signal 101 is received by the motion estimation unit 1004. Motion estimation is performed between an input image and the decoded image of a previous frame by the motion estimation unit 1004. Unit 1004 also derives the motion vectors of the grid points of the input image which is output as motion information 120 to the multiplexer 122. Motion information 120 is also transmitted to the predicted image synthesizer 1005 which synthesizes the predicted image of motion compensation using the fast algorithm and outputs the predicted image of the present frame 117 to the adder 102 for synthesizing the error image by calculating the difference between the predicted image and the input image.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of synthesizing an inter-frame predicted image in a video decoder, comprising the steps of:

performing a motion compensation process between a current image and a reference image, wherein said motion compensation process includes the steps of:

dividing said current image into N patches, N being a positive integer, arranging an assumed patch for at least one patch Pb, which has four assumed grid points as representative points having coordinates (I', J'), (I'+p, J'), (I', J'+q), and (I'+p, J'+q), obtaining motion vectors of the four representative points, computing a motion vector of each pixel in the patch Pb by bilinear transformation using the motion vectors of the four representative points, wherein either of p and −p is equal to $2^\alpha$, $\alpha$ being a positive integer, and wherein either of q and −q is equal to $2^\beta$, $\beta$ being a positive integer, wherein when the horizontal and vertical components of motion vectors at representative points (I',J'), (I'+p,J'), (I',J'+q), and (I'+p,J'+q) take only values integral multiples of 1/k, wherein k is equal to $2^{h0}$ and h0 is an integer other than a negative integer, and the horizontal and vertical components of the motion vector of each pixel take only values integral multiples of 1/m, wherein m is a positive integer, and (u(x,y), v(x,y)), wherein x, y, u(x,y), and v(x,y) are integers, obtained by multiplying the horizontal and vertical components of the motion vector of a pixel (x,y) in the patch Pb by m by using (u0, v0), (u1,v1), (u2,v2), and (u3,v3), wherein u0, v0, u1, v1, u2, v2, u3, and v3 are integers, obtained by multiplying the horizontal and vertical components of the motion vectors at the representative points (I',J'), (I'+p,J'), (I',J'+q), and (I'+p,J'+q) by k as per u(x,y)=((u0(I'+p−x)+u1(x−I'))(J'+q−y)+(u2(I'+p−x)+u3(x−I'))(y−J'))m//(p·q·k) and v(x,y)=((v0(I'+p−x)+v1(x−I'))(J'+q−y)+(v2(I'+p−x)+v3(x−I'))(y−J'))m//(p·q·k), wherein symbol "//" denotes a division for rounding an operation result obtained from a division of a real number into a nearby integer when the result is not an integer and its priority as an operator is equal to that of a multiplication or division.

2. A method according to claim 1, wherein the patch Pb is a rectangle;

wherein grid points are present at apexes of the patch Pb;

wherein the coordinates of each grid point can be shown by (I,J), (I+r,J), (I,J+s), and (I+r,J+s), wherein I, J, r, and s are integers;

wherein the horizontal and vertical components of the motion vectors at these grid points take values integral multiples of 1/n, wherein n is a positive integer; and wherein (u0,v0), (u1,v1), (u2,v2), and (u3,v3) shown by u'(x,y)=((J+s−y)(u00(I+r−x)+u01(x−I))+(y−J)(u02(I+r−x)+u03(x−I)))k//(r·s·n) v'(x, y)=((J+s−y)(v00 (I+r−x)+v01·(x−I))+(y−J)(v02(I+r−x)+v03·(x−I)))k///(r·s·n), u0=u'(I',J'), v0=v'(I',J'), u1=u'(I'+p,J'), v1=v'(I'+p,J'), u2=u'(I',J'+q), v2=v'(I',J'+q), u3=u'(I'+p,J'+q), and v3=v'(I'+p,J'+q), wherein symbol "///" denotes a division for rounding an operation result obtained from a division of a real number into a nearby integer when the result is not an integer and its priority as an operator is equal to that of a multiplication or division, by using (u00,v00), (u01,v01), (u02,v02), and (u03,v03), wherein u00, v00, u01, v01, u02, v02, u03, and v03 are integers) obtained by multiplying the horizontal and vertical components of the motion vector of each grid point by n, are used as values obtained by multiplying the horizontal and vertical components of the motion vectors of the representative points (I',J'), (I'+p,J'), (I',J'+q), and (I'+p,J'+q) of the patch Pb by k.

3. A method according to claim 2, wherein the absolute value of p/2 is smaller than that of r, wherein the absolute value of p is that of r or larger, wherein the absolute value of q/2 is smaller than that of s, and wherein the absolute value of q is that of s or larger.

4. A method according to claim 2, wherein the absolute value of p is that of r or smaller, wherein the absolute value of 2p is larger than that of r, wherein the absolute value of q is that of s or smaller, and wherein the absolute value of 2q is larger than that of s.

5. A method according to claim 2, wherein symbol "//" is defined as an operation for rounding an operation result obtained from a division of a real number into a nearest integer.

6. A method according to claim 1, wherein a rectangle enclosed by representative points includes every pixel in a patch Pb but it does not include all the pixels in the patch Pb by halving the values of p and q.

7. A method according to claim 1, wherein symbol "//" is defined as an operation for rounding an operation result obtained from a division of a real number into a nearest integer.

8. A method of synthesizing an inter-frame predicted image in a video decoder, comprising the steps of:

performing a motion compensation process between a current image and a reference image, wherein said motion compensation process includes the steps of:

dividing said current image into N patches, N being a positive integer, arranging an assumed patch for at least one patch Pb, which has four assumed grid points as representative points having coordinates (I', J'), (I'+p, J'), (I', J'+q), and (I'+p, J'+q), obtaining motion vectors of the four representative points, and computing a motion vector of each pixel in the patch Pb by bilinear transformation using the motion vectors of the four representative points, wherein either of p and −p is equal to $2^\alpha$, $\alpha$ being a positive integer, wherein either of q and −q is equal to $2^\beta$, $\beta$ being a positive integer, wherein the patch Pb is a rectangle;

wherein grid points are present at apexes of the patch Pb;

wherein the coordinates of each grid point can be shown by (I,J), (I+r,J), (I,J+s), and (I+r,J+s), wherein I, J, r, and s are integers, wherein the horizontal and vertical components of the motion vectors at these grid points take values integral multiples of 1/n, wherein n is a positive integer, and wherein (u0,v0), (u1,v1), (u2,v2), and (u3,v3) shown by u'(x,y)=((J+s−y) (u00(I+r−x)+u01(x−I))+(y−J)(u02(I+r−x)+u03(x−I)))k//(r·s·n) v'(x,y)=((J+s−y)(v00(I+r−x)+v01(x−I))+(y−J)(v02(I+r−x)+v03(x−I)))k///(r·s·n), u0=u'(I',J'), v0=v'(I',J'), u1=u'(I'+p,J'), v1=v'(I'+p,J'), u2=u'(I',J'+q), v2=v'(I',J'+q), u3=u'(I'+p,J'+q), and v3=v'(I'+p,J'+q), wherein symbol "///" denotes a division for rounding an operation result obtained from a division of a real number into a nearby integer when the result is not an integer and its priority as an operator is equal to that of a multiplication or division, by using (u00,v00), (u01,v01), (u02,v02), and (u03,v03), wherein u00, v00, u01, v01, u02, v02, u03, and v03 are integers) obtained by multiplying the horizontal and vertical components of the motion vector of each grid point by n, are used as values obtained by multiplying the horizontal and vertical components of the motion vectors of the representative points (I',J'), (I'+p,J'), (I',J'+q), and (I'+p,J'+q) of the patch Pb by k.

9. A method according to claim 8, wherein symbol "//" is defined as an operation for rounding an operation result obtained from a division of a real number into a nearest integer.

10. A method according to claim 9, wherein the absolute value of p/2 is smaller than that of r, wherein the absolute value of p is that of r or larger, wherein the absolute value of q/2 is smaller than that of s, and wherein the absolute value of q is that of s or larger.

11. A method according to claim 9, wherein the absolute value of p is that of r or smaller, wherein the absolute value of 2p is larger than that of r, wherein the absolute value of q is that of s or smaller, and wherein the absolute value of 2q is larger than that of s.

12. A method according to claim 9, wherein symbol "//" is defined as an operation for rounding an operation result obtained from a division of a real number into a nearest integer.

13. A method according to claim 8, wherein the absolute value of p/2 is smaller than that of r, wherein the absolute value of p is that of r or larger, wherein the absolute value of q/2 is smaller than that of s, and wherein the absolute value of q is that of s or larger.

14. A method according to claim 8, wherein the absolute value of p is that of r or smaller, wherein the absolute value of 2p is larger than that of r, wherein the absolute value of q is that of s or smaller, and wherein the absolute value of 2q is larger than that of s.

15. A method according to claim 8, wherein a rectangle enclosed by representative points includes every pixel in a patch Pb but it does not include all the pixels in the patch Pb by halving the values of p and q.

16. A method according to claim 8, wherein symbol "//" is defined as an operation for rounding an operation result obtained from a division of a real number into a nearest integer.

* * * * *